United States Patent
Xu et al.

(10) Patent No.: US 10,958,618 B2
(45) Date of Patent: Mar. 23, 2021

(54) ESIM-BASED CARD POOL SYSTEM AND CONTROL METHOD THEREOF

(71) Applicant: Skyroam Technology Co., Ltd., Guangdong (CN)

(72) Inventors: Richard H. Xu, San Jose, CA (US); Jing Liu, Mountain View, CA (US); Chao Wang, Guangdong (CN); Zhen Zhang, Guangdong (CN)

(73) Assignee: SIMO Holdings Inc., Grand Cayman (KY)

(*) Notice: Subject to any disclaimer, the term of this patent is extended or adjusted under 35 U.S.C. 154(b) by 0 days.

(21) Appl. No.: 16/529,552

(22) Filed: Aug. 1, 2019

(65) Prior Publication Data

US 2020/0228487 A1 Jul. 16, 2020

(51) Int. Cl.
*H04L 29/12* (2006.01)
*H04W 8/20* (2009.01)

(52) U.S. Cl.
CPC ......... *H04L 61/1588* (2013.01); *H04W 8/205* (2013.01); *H04L 61/6054* (2013.01); *H04L 61/6095* (2013.01)

(58) Field of Classification Search
CPC ......... H04L 67/306; H04L 67/34; H04L 9/30; H04W 12/06; H04W 8/18; H04W 8/183; H04W 8/20; H04W 8/205
See application file for complete search history.

(56) References Cited

U.S. PATENT DOCUMENTS

| | | | | |
|---|---|---|---|---|
| 9,813,989 B2* | 11/2017 | Su | ......................... | H04W 36/38 |
| 10,375,567 B2* | 8/2019 | Xiong | ..................... | H04W 4/60 |
| 10,805,789 B2* | 10/2020 | Ahmed | ............. | H04W 12/0023 |
| 10,820,190 B2* | 10/2020 | Xu | ........................ | H04W 76/12 |
| 2013/0029637 A1* | 1/2013 | Hillier | ..................... | H04W 8/26 455/411 |
| 2016/0183081 A1* | 6/2016 | Flores Cuadrado | .... | H04W 4/24 455/558 |
| 2018/0242138 A1* | 8/2018 | Chen | ....................... | H04W 8/24 |
| 2019/0104401 A1* | 4/2019 | Park | ....................... | H04L 29/08 |
| 2020/0252788 A1* | 8/2020 | Lou | ...................... | H04W 8/245 |

* cited by examiner

*Primary Examiner* — Liton Miah

(74) *Attorney, Agent, or Firm* — K&L Gates LLP; Jordan A. Kwan

(57) ABSTRACT

An eSIM-based card pool system is disclosed, the system comprising: a card pool unit comprising a plurality of eSIMs; an eSIM manager, comprising a database that stores corresponding relationships between a plurality of eSIM identifications and a plurality of eSIM addresses; and a connection manager, configured to request a first eSIM address from the eSIM manager based on a received download instruction, and write a specified eSIM profile into a first eSIM having the first eSIM address.

13 Claims, 10 Drawing Sheets

After receiving a download instruction, a connection manager issues a request to inquire an eSIM address to the EID status manager, receives a returned eSIM address, and according to the eSIM address, establishes a communication connection between a specific eSIM card and a subscriber data routing server.

The specific eSIM card downloads a relevant instruction from the subscriber data routing server, and according to the relevant instruction, downloads a specified profile from a subscriber data storage server.

Fig. 9

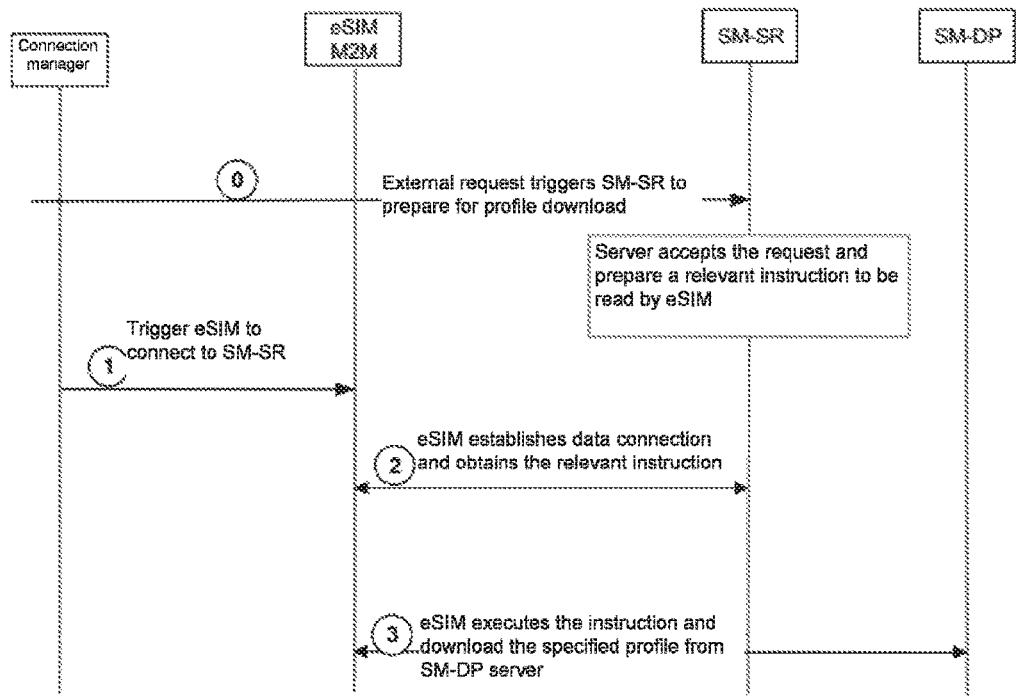

Fig. 10

After receiving a download instruction, a connection manager issues a request to inquire an eSIM address to an EID status manager, receives a returned eSIM address, and generates a triggering instruction and sends it to an LPA manager.

According to the triggering instruction sent by the connection manager, the LPA manager establishes a communication connection between a specific eSIM card and a subscriber data storage server, and after downloading a specified profile, the LPA manager writes the specified profile into the specific eSIM card.

Fig. 11

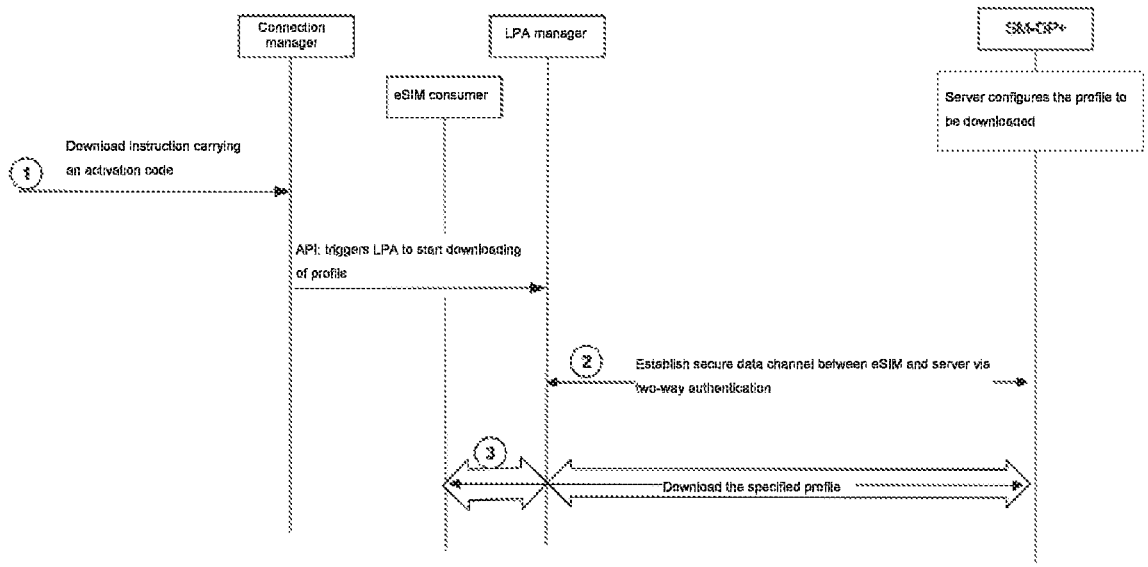

Fig. 12

A user interface unit receives user operation information, generates a download instruction, and sends it to the connection manager;

After receiving a download instruction, a connection manager issues an eSIM address request to the EID status manager, receives the requested eSIM address, generates a triggering instruction and sends it to the LPA manager;

According to the triggering instructions sent by the connection manager, the LPA manager establishes a communication connection between a specific eSIM card and a subscriber data storage server, after downloading the specified profile, the LPA manager writes the specified profile to the specific eSIM card.

Fig. 13

A wireless receiver receives an SMS message, generates a download instruction after demodulation and sends it to the connection manager;

After receiving the download instruction, the connection manager issues an eSIM address request to the EID status manager, receives the requested eSIM address, and establishes a communication connection between a specific eSIM card and a subscriber data storage server;

The specific eSIM card downloads a relevant instruction from the subscriber data routing server, and according to the relevant instruction, downloads the specified profile from the subscriber data storage server.

Fig. 14

ESIM-BASED CARD POOL SYSTEM AND CONTROL METHOD THEREOF

RELATED APPLICATION

This application claims priority to Chinese Patent Application No. 201910027450.2, filed on Jan. 11, 2019, the entirety of which is incorporated by reference herein.

TECHNICAL FIELD

This invention involves the field of card pool system technology, especially an electronic subscriber identity module (eSIM)-based card pool system and a control method thereof.

BACKGROUND

With the rapid development of the Internet and the Internet of things, data traffic roaming has become normal. To reduce roaming costs, users in different regions are demanding flexible distribution and use of subscriber identity module (SIM) cards of different operators so as to enjoy local low data traffic rates. The emergence of this demand inevitably requires virtual operators or third-party companies to build a large card pool system in the back end to store and manage SIM card information of a large number of different operators.

The existing SIM card pool technology is all based on physical SIM cards, e.g., building an electronic circuit system in the back end. The basic components of this system include a CPU, logic control components field-programmable gate array (FPGA)/complex programmable logic device (CPLD), a SIM card strip, a card reading circuit, SIM card slots and buses. The physical SIM cards are inserted one-to-one into the card slots, and the entire circuit system constitutes a SIM card pool and is placed in the cloud to provide cloud SIM card service for remote mobile terminal devices.

However, the physical SIM card pool requires a lot of human intervention in the management, including the batch quantity purchasing of SIM cards, verification, physical installation/replacement, balance monitoring, etc. When the number of cards increases to tens of millions or hundreds of millions, it is almost impossible to handle manually. As one physical SIM card corresponds to a specific operator, new SIM cards should be bought when operators are added, making the process cumbersome and time-consuming. In this case, a card pool system that can change operators without changing the SIM cards is necessary in practical service to facilitate convenient card pool management.

SUMMARY OF THE INVENTION

The present invention provides an eSIM-based card pool system and a control method thereof, aiming to solve the difficulty in card pool system management.

To achieve the above purpose, the present invention provides an eSIM-based card pool system comprising a provisioning manager, an eUICC ID (EID) status manager, a connection manager, and an eSIM card pool unit, wherein:

the provisioning manager sends a request for query of an eSIM address to the EID status manager according to a received provisioning instruction, receives the requested eSIM address, and controls a specific eSIM card to write an initial profile according to the eSIM address;

the EID status manager receives a request for query of an eSIM address and returns an eSIM address;

the connection manager sends a request for query of an eSIM address to the EID status manager according to a received download instruction, receives the requested eSIM address, and controls a specific eSIM card to write a specified profile according to the eSIM address; and the eSIM card pool unit writes the initial profile into the specific eSIM card according to the control of the provisioning manager, and writes the specified profile into the specific eSIM card according to the control of the connection manager.

Compared to the prior art, the eSIM-based card pool system disclosed by the present invention utilizes eSIM cards characterized by being capable of downloading and using specified SIM profiles, to construct a card pool system using eSIM cards and achieve change of operator by changing the profiles of eSIM cards, thus solving the difficulty in the management of physical SIM card pool systems due to the fact that as a physical SIM card corresponds to a specific operation, new SIM cards are needed if operators are added. Specifically, the present invention constructs an eSIM card pool unit comprising a plurality of eSIM cards and uses an EID status manager to manage the eSIM cards in the eSIM card pool unit, wherein the EID status manager supports the use of a provisioning manager and a connection manager in addressing and enables them to write an initial profile or a specified profile into a specific eSIM card. The provisioning manager can set up a data channel between the specific eSIM card and the outside, write an initial profile into a specific eSIM card to conduct the initial configuration of the card pool system, thus ensuring that the card pool system can change the profiles in the specific eSIM cards through the connection manager, so as to achieve the change of operators. The connection manager can set up the data channel between the specific eSIM card and the network side server (subscription manager secure routing ("SM-SR") server or subscription manager data preparation ("SM-DP") server), and achieve the change of operators by writing the specified profiles in the specific eSIM cards. The presents invention builds a card pool system based on eSIM cards, and enables the management of the card pool system to be achieved based on software control without manual intervention, which is different from the current physical SIM card pool, which requires a lot of human intervention in the management, including the batch quantity purchasing of SIM cards, verification, physical installation/replacement, balance monitoring, etc. As one physical SIM card corresponds to a specific operator, new SIM cards should be bought when operators are added, making the process cumbersome and time-consuming. Thus, the present invention provides a card pool system that can change operators without changing SIM cards to achieve the convenient management of a card pool.

Further, the eSIM card-based card pool system also comprises a local profile assistant (LPA) manager used to receive the triggering instruction from the connection manager, download the specified profile, and write it into a specific eSIM card.

In a preferred embodiment of the present invention, the system supports the consumer specification by adding an LPA manager. In this embodiment, the system supports both the machine-to-machine (M2M) specification and the consumer specification, and users can choose to use any of the specifications, thus expanding the scope of application of the present invention and improving its practicability.

Further, the eSIM card-based card pool system also comprises a user interface unit used to receive user operation information and generate and send download instructions to the connection manager.

In a preferred embodiment of the present invention, by adding a user interface unit, the system can control the connection manager to trigger the LPA manager to establish the communication connection between the specific eSIM card and the SM-DP+ server according to the consumer's choice, and write the specified profile to the specific eSIM card to achieve change of operator, thus implementing the standard consumer specification and further expanding the scope of application of the present invention.

Further, the eSIM card-based card pool system also comprises a wireless receiver used to receive short message service (SMS) messages, generate download instructions after decoding and send them to the connection manager.

In a preferred embodiment of the present invention, by adding a wireless receiver, the system could establish a communication connection between the specific eSIM card and the subscriber data routing SM-SR server via the user SMS control of the connection manager, and download the specified profile from the subscriber data storage SM-DP server into the specific eSIM card to implement the change of operator, thus implementing the standard M2M specification and further expanding the scope of application of the present invention.

Further, the eSIM card-based card pool system also comprises at least one card pool board, wherein the card pool board comprises a serial port controller and at least an eSIM card group, each eSIM card in the eSIM card group is connected to the serial port controller, and the serial port controller receives the initial profile or specified profile and writes it into the specific eSIM card.

In a preferred embodiment of the present invention, the eSIM card pool unit comprises at least one card pool board, and each card pool board is connected to the provisioning manager, the connection manager and/or the LPA manager via bus. Therefore, the system can achieve unlimited expansion of the card pool by adding card pool boards, which solves the problem that a physical SIM pool cannot meet the scale expansion at present.

Further, the eSIM card-based card pool system also comprises a trusted execution environment (TEE) unit, wherein the trusted execution environment unit comprises a trusted virtual serial port and at least one eSIM instance group (instead of physical eSIM chips), each eSIM instance in the eSIM instance group communicates with the trusted virtual serial port, and the trusted virtual serial port receives an initial profile or a specified profile and writes it to a specific eSIM instance.

In a preferred embodiment of the present invention, the eSIM card pool unit comprises a trusted execution environment unit, a trusted virtual serial port, and at least one eSIM instance group that connects to the provisioning manager, the connection manager, and/or the LPA manager through the trusted execution environment interface. Unlimited expansion of card pool can be achieved by adding eSIM instance groups, which solves the problem that physical SIM card pool cannot meet the scale expansion.

In addition, the present invention provides a control method of an eSIM-based card pool system, wherein:

after receiving a download instruction, a connection manager issues a request for an eSIM address to an EID status manager, receives a returned eSIM address, and establishes a communication connection between a specific eSIM card (or eSIM instance) and a subscriber data routing server according to the eSIM address; and the specific eSIM card downloads a relevant instruction from the subscriber data routing server (e.g., SM-SR), and according to the relevant instruction, downloads the specified profile from a subscriber data storage server (e.g., SM-DP).

The control method of the eSIM-based card pool system provided by the present invention is to match the eSIM card pool system of the aforementioned embodiments. In this method, external application programming interface (API) instructions are used to trigger the connection manager to establish the data connection between the specific eSIM card and the subscriber data routing SM-SR server. Through this data channel, the specific eSIM card obtains a relevant instruction from the subscriber data routing SM-SR server, and based on the instruction, the specific eSIM card then downloads the corresponding SIM profile from the network end subscriber data storage SM-DP server. In this method, the original M2M control process is improved, the whole download process does not rely on SMS triggering, and the external API instruction and remote network end configuration are implemented by software, which greatly improves the control efficiency. Also, because SMS is no longer needed, there is no need to rely on building SMS centers, saving costs and maintenance. At the same time, the connection manager can connect to a plurality of groups of subscriber data routing SM-SR servers and subscriber data storage SM-DP servers to download SIM profiles of different operators from different networks and write them into different card pool groups.

Further, the present invention provides a control method of an eSIM-based card pool system, wherein:

after receiving a download instruction, a connection manager issues an eSIM address request to an EID status manager, receives the requested eSIM address, and generates a triggering instruction and sends it to an LPA manager;

according to the triggering instruction sent by the connection manager, the LPA manager establishes a communication connection between the specific eSIM card and a subscriber data storage server, and after downloading a specified profile, writes the specified profile to the specific eSIM card.

In a preferred embodiment of the present invention, a control method is provided to match the aforesaid embodiments containing an LPA manager. In this method, an instruction of downloading the SIM profile is sent to the connection manager through the software API interface, and according to the instruction, the LPA manager connects to the corresponding subscriber data storage SM-DP+ server to download the specified profile and write it to the corresponding eSIM card pool (or eSIM instance group). This method provides an improved consumer specification that does not require a user interface and improves control efficiency through direct control by API instruction. In addition, the eSIM card pool has a high flexibility and can connect with a plurality of subscriber data storage SM-DP+ servers, realizing convenient download of SIM profiles from a plurality of operator platforms and flexible switching between a plurality of operators.

Further, the present invention provides a control method of an eSIM-based card pool system, wherein:

a user interface unit receives user operation information, generates a download instruction, and sends it to a connection manager;

after receiving a download instruction, a connection manager issues an eSIM address request to an EID status manager, receives the requested eSIM address, generates a triggering instruction and sends it to an LPA manager;

according to the triggering instruction sent by the connection manager, the LPA manager establishes a communication connection between a specific eSIM card and a subscriber data storage server, and after downloading a specified profile, writes the specified profile to the specific eSIM card.

In a preferred embodiment of the present invention, a control method is provided to match the aforesaid embodiments containing an LPA manager and a user interface unit. In this method, the user interface unit receives user operation information, generates a download instruction, and sends it to the connection manager. By adding a user interface, consumer selection is achieved, and the standard consumer specification is implemented which makes the invention applicable to the standard consumer specification and improves the practicability of the present invention.

Further, the present invention provides a control method of an eSIM-based card pool system, wherein:

a wireless receiver receives an SMS message, generates a download instruction after decoding and sends it to a connection manager;

after receiving the download instruction, the connection manager issues an eSIM address request to an EID status manager, receives the requested eSIM address, and establishes a communication connection between a specific eSIM card and a subscriber data routing server;

the specific eSIM card downloads a relevant instruction from the subscriber data routing server, and according to the relevant instruction, downloads a specified profile from a subscriber data storage server.

In a preferred embodiment of the present invention, a control method is provided to match the aforesaid embodiments containing a wireless receiver. In this method, after receiving a message, the wireless receiver generates a download instruction after decoding and sends it to the connection manager. By adding the wireless receiver, the connection manager can be triggered by SMS, thus implementing the standard M2M specification, making the invention applicable to the standard M2M specification and improving the practicability of the present invention.

In a preferred embodiment of the present invention, an eSIM-based card pool system comprising: a card pool unit comprising a plurality of software-based eSIM applications; a profile information database, comprising a plurality of eSIM profiles; a connection manager, configured to write a specified eSIM profile into the profile information database; and a virtual SIM manager, configured to create the plurality of eSIM applications based on the plurality of eSIM profiles in the profile information database.

In a preferred embodiment of the present invention, the eSIM-based card pool system further comprises a provisioning manager, configured to write an initial eSIM profile into the profile information database.

In a preferred embodiment of the present invention, the profile information database further comprises a plurality of authentication keys associated with the plurality of eSIM profiles.

In a preferred embodiment of the present invention, the virtual SIM manager is further configured to receive an APDU from an operator, relay the APDU to one of the plurality of eSIM applications, receive a response to the APDU from the eSIM application, and send the response to the APDU to the operator.

BRIEF DESCRIPTION OF THE DRAWINGS

FIG. 9 is a flow chart of an embodiment of a control method of an eSIM-based card pool system;

FIG. 10 is a signaling flow diagram of an embodiment of a control method of an eSIM-based card pool system;

FIG. 11 is a flow chart of an embodiment of a control method of an eSIM-based card pool system;

FIG. 12 is a signaling flow diagram of an embodiment of a control method of an eSIM-based card pool system;

FIG. 13 is a flow chart of an embodiment of a control method of an eSIM-based card pool system; and FIG. 14 is a flow chart of an embodiment of a control method of an eSIM-based card pool system.

DETAILED DESCRIPTION

Figure 1:
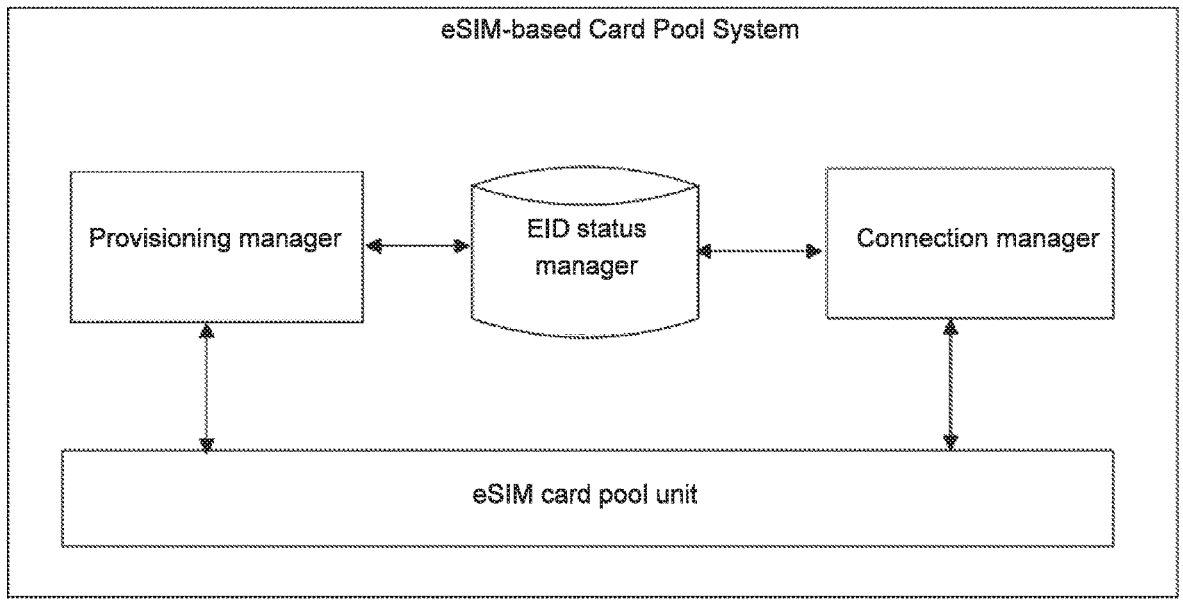
FIG. 1 is a block diagram of an embodiment of an eSIM-based card pool system.

As shown in FIG. 1, an eSIM-based card pool system of the present invention comprises a provisioning manager, an EID status manager, a connection manager, and an eSIM card pool unit, wherein:

the provisioning manager sends a request for query of an eSIM address to the EID status manager according to a received provisioning instruction, receives the requested eSIM address, and controls a specific eSIM card to write an initial profile according to the eSIM address;

the EID status manager receives a request for query of an eSIM address and returns an eSIM address;

the connection manager sends a request for query of an eSIM address to the EID status manager according to a received download instruction, receives the requested eSIM address, and controls a specific eSIM card to write a specified profile according to the eSIM address; and the eSIM card pool unit writes the initial profile into the specific eSIM card according to the control of the provisioning manager, and writes the specified profile into the specific eSIM card according to the control of the connection manager.

In some embodiments, for example in consumer specification applications as discussed below, the process of writing the initial profile may be optional.

In an embodiment of the present invention, the basic function of the EID status manager in the present invention is to store one-to-one corresponding relations between the physical addresses of all eSIMs on a card pool board (or a group of eSIM instances within TEE, or a group of software instances each of which can run a UICC or eSIM process) and EIDs for use in addressing by the provisioning manager/connection manager. In addition, the EID status manager can also be used to dynamically record various states of each eSIM, such as whether an eSIM is enabled or idle or information of each profile in the eSIM card (or eSIM instance). In one specific implementation, as a pure database, the EID status manager can be part of the connection manager, but can also be accessed by the provisioning manager.

Figure 2:
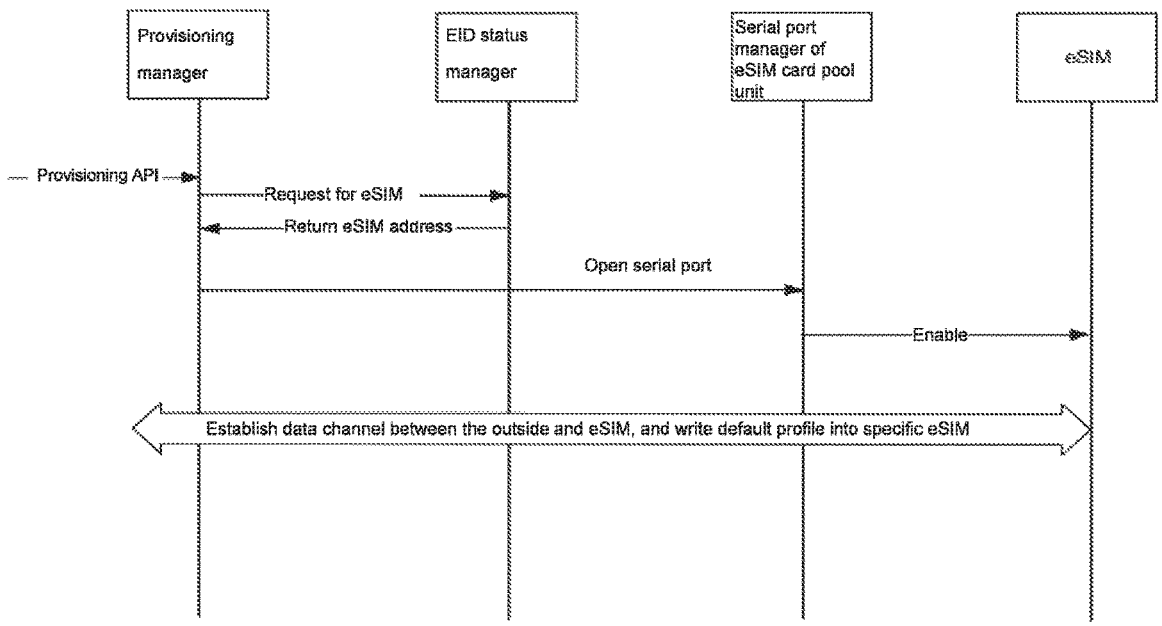
FIG. 2 is a signaling flow diagram of a provisioning manager in an embodiment of an eSIM-based card pool system.

In one embodiment of the present invention, the provisioning manager can establish a data channel between a specific eSIM card and the outside, and write the initial profile into a specific eSIM card to complete the initial configuration of the card pool system, ensuring that the card pool system can achieve the change of operator by changing the profile in the specific eSIM card. The signaling process for the provisioning manager to write the initial profile into a specific eSIM card is shown in FIG. 2.

Figure 3:
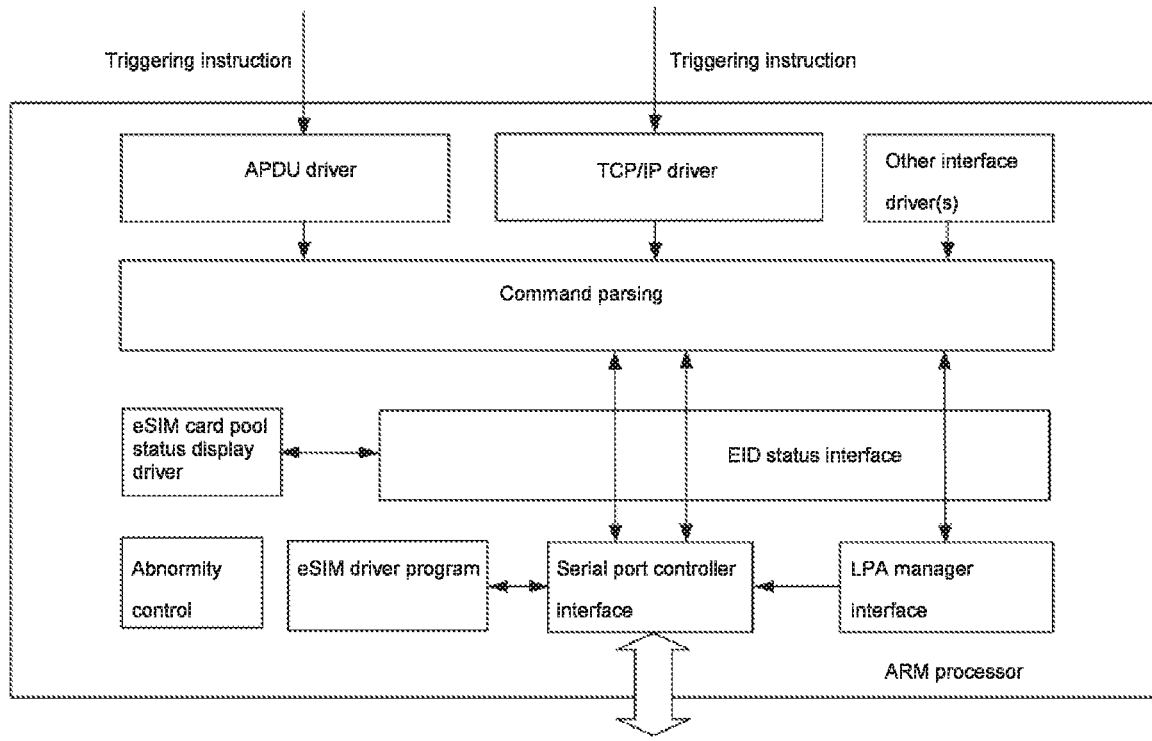
FIG. 3 is a block diagram of a connection manager in an embodiment of an eSIM-based card pool system.

As shown in FIG. 3, in one embodiment of the present invention, the difference between the provisioning manager and the connection manager lies in different usage scenarios and different interface forms. In one specific implementation, both exist in the form of software modules and can be based on the same CPU. Taking the connection manager in FIG. 3 as an example, it includes but is not limited to various driver modules, a command parsing module, an EID status manager interface, an LPA manager interface, a serial port controller interface, an eSIM driver module, etc. When an external instruction is received by the connection manager, an EID value is obtained via the instruction parsing module and the corresponding eSIM physical address is obtained from the EID status manager. If the instruction is in application protocol data unit (APDU) or M2M format, the corresponding eSIM is enabled by the serial controller. The eSIM driver module is responsible for activating the corresponding eSIM card, thus completing the card recognition process. For applications that comply with the consumer specification, this external instruction will be sent to the LPA manager and the LPA will lead the control of eSIM. From the perspective of hardware, eSIM card pool board structure includes but is not limited to a CPU, an FPGA/CPLD logic control, a TCP/IP interface, a USB interface, a card reading module, etc.

Compared to the prior art, the eSIM-based card pool system disclosed by the present invention utilizes eSIM cards characterized by being capable of downloading and using specified SIM profiles, to construct a card pool system using eSIM cards and achieve change of operator by changing the profiles of eSIM cards, thus solving the difficulty in the management of physical SIM card pool systems due to the fact that as a physical SIM card corresponds to a specific operation, new SIM cards are needed if operators are added. Specifically, the present invention constructs an eSIM card pool unit comprising a plurality of eSIM cards and uses an EID status manager to manage the eSIM cards in the eSIM card pool unit, wherein the EID status manager supports the use of a provisioning manager and a connection manager in addressing and enables them to write an initial profile or a specified profile into a specific eSIM card. The provisioning manager can set up a data channel between the specific eSIM card and the outside, write an initial profile into a specific eSIM card to conduct the initial configuration of the card pool system, thus ensuring that the card pool system can change the profiles in the specific eSIM cards through the connection manager, so as to achieve the change of operators. The connection manager can set up the data channel between the specific eSIM card and the network side server (subscriber data routing SM-SR server or subscriber data storage SM-DP server), and achieve the change of operators by writing the specified profiles in the specific eSIM cards. In addition, the provisioning manager, EID status manager and connection manager of the present invention can be achieved on the same circuit board with the eSIM card pool unit, and can also be remotely connected with the eSIM card pool unit through IP or other protocols, making the system highly flexible. The present invention builds a card pool system based on eSIM cards, and enables the management of the card pool system to be achieved based on software control without manual intervention, which is different from the current physical SIM card pool, which requires a lot of human intervention in the management, including the batch quantity purchasing of SIM cards, verification, physical installation/replacement, balance monitoring, etc. As one physical SIM card corresponds to a specific operator, new SIM cards should be bought when operators are added, making the process cumbersome and time-consuming. Thus, the present invention provides a card pool system that can change operators without changing the SIM cards to achieve the convenient management of a card pool.

Figure 4:
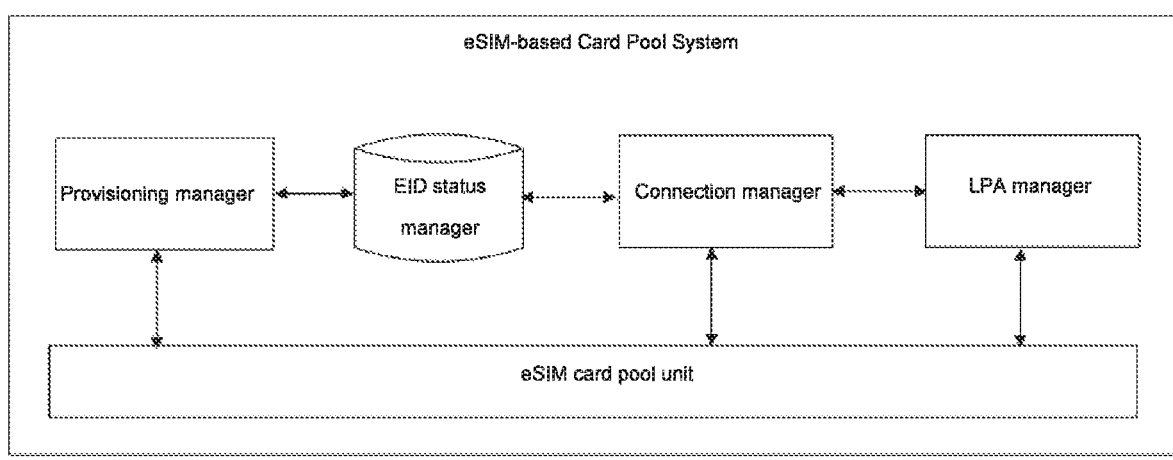
FIG. 4 is a block diagram of another embodiment of an eSIM-based card pool system.

As shown in FIG. 4, an eSIM-based card pool system of the present invention also comprise an LPA manager, wherein the LPA manager receives a triggering instruction from the connection manager, downloads a specified profile, and writes it into a specific eSIM card.

The present invention builds a card pool system based on eSIM cards. For eSIM technology, GSMA has defined two eSIM-based schemes. The first is the machine-to-machine (M2M) scheme applicable to the Internet of Things (IoT), in which the mobile operator opens a data channel by triggering eSIM/eUICC (electronic universal integrated circuit card) through SMS, and then obtains the download instruction from the subscriber data routing SM-SR server and finally downloads the corresponding SIM profile from the subscriber data storage SM-DP server to the target eSIM/eUICC. The second scheme is consumer eSIM applicable to average consumers, in which the user holds the activation code and triggers the download instruction through the Local Profile Assistant (LPA). After LPA and the subscriber data storage SM-DP+ server establish a secure channel, the SIM profile is downloaded to the eSIM/eUICC of the terminal device. In this method, external API instructions are used to trigger the connection manager to establish a data connection between the specific eSIM card and the subscriber data routing SM-SR server. Through this data channel, the specific eSIM card obtains a relevant instruction from the subscriber data routing SM-SR server, and based on the instruction, the specific eSIM card then downloads the corresponding SIM profile from the network end subscriber data storage SM-DP server. The M2M control process can be implemented by non-message triggering, but the consumer process cannot be implemented, limiting the application scope of the system.

In this regard, in a preferred embodiment of the present invention, the system supports the consumer specification by adding an LPA manager. In this embodiment, an LPA manager is added, wherein the LPA manager receives the triggering instruction from the connection manager, downloads the specified profile, and writes it into a specific eSIM card to enable the system to support the consumer specification. The system supports both the M2M specification and the consumer specification, and users can choose to use any of the specifications, thus expanding the application scope of the present invention and improving its practicability.

The eSIM-based card pool system of the present invention also comprises a user interface unit used to receive user operation information and generate and send download instructions to the connection manager.

Figure 5:
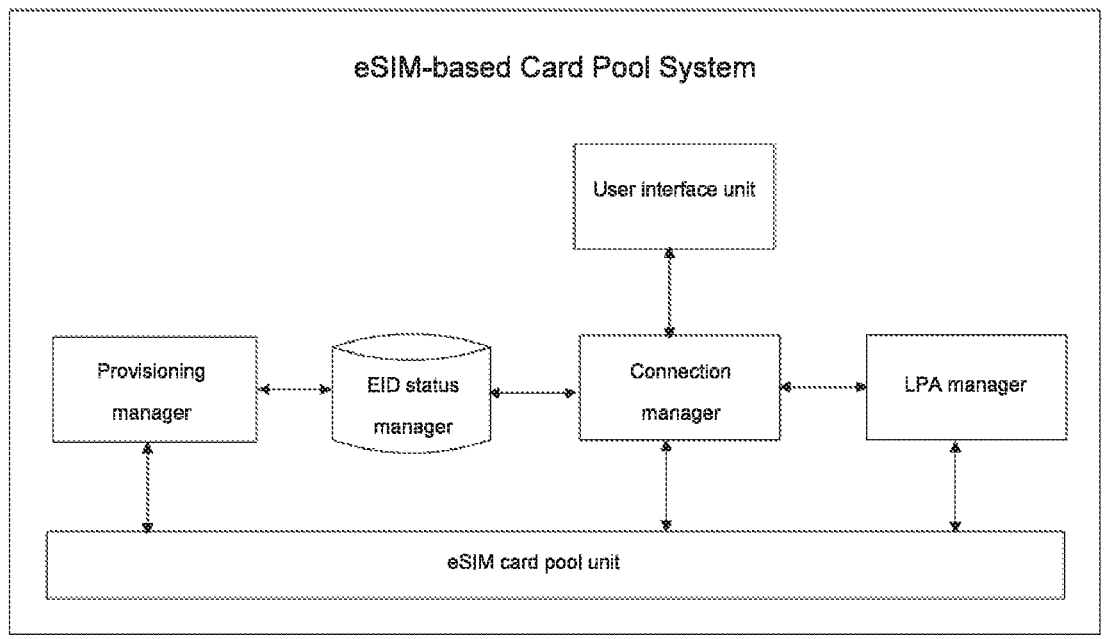
FIG. 5 is a block diagram of another embodiment of an eSIM-based card pool system.

An embodiment of the present invention is shown in FIG. 5. The aforesaid embodiments of the present invention can implement the consumer specification without consumer selection. But in the control process of the standard customer specification, the user holds the activation code and triggers the download instruction through the LPA manager unit. After the LPA manager and the subscriber data storage SM-DP+ server establish a secure channel, the SIM profile is downloaded to the eSIM/eUICC of the terminal device. To support the standard customer specification control process, a user interface unit is added in this embodiment to receive user operation information, generate a download instruction and send it to the connection manager. By adding a user interface, consumer selection is achieved and the standard consumer specification is implemented, making the present invention applicable to the standard consumer specification. The application scope of the present invention is further expanded to support not only the efficient improved consumer specification, but also the standard consumer specification through the user interface unit.

The eSIM-based card pool system of the present invention also comprises a wireless receiver used to receive messages, generate download instructions after decoding and send them to the connection manager.

Figure 6:
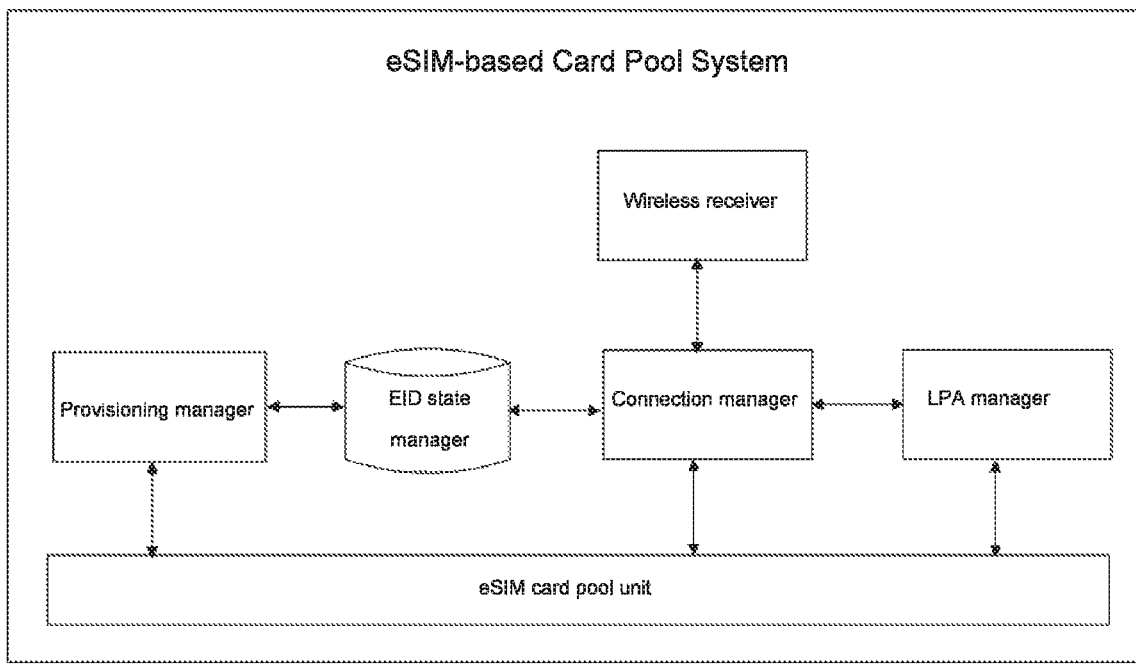
FIG. 6 is a block diagram of another embodiment of an eSIM-based card pool system.

An embodiment of the present invention is shown in FIG. 6. The aforesaid embodiments of the present invention can implement non-message M2M specification, but in the standard M2M specification control process, the mobile operator triggers eSIM/eUICC through SMS to open the data channel, and then obtains the download instruction from the subscriber data routing SM-SR server and finally downloads the corresponding SIM profile from the subscriber data storage SM-DP server to the target eSIM/eUICC. To support the standard M2M control process, in this embodiment a wireless receiver is added to enable the system to control the connection manager, according to the user's message, to establish a communication connection between the specific eSIM card and the subscriber data routing SM-SR server, to download a specified profile from the subscriber data storage SM-DP server into the specified eSIM card so as to achieve the change of operator, implementing the standard M2M specification. The application scope of the present invention is further expanded to support not only the efficient improved M2M specification, but also the standard M2M specification through the wireless receiver.

In an eSIM-based card pool system of the present invention, the eSIM card pool unit comprises at least one card pool board, the card pool board comprises a serial port controller and at least an eSIM card group, each eSIM card in the eSIM card group being connected to the serial port controller, and the serial port controller receives an initial profile or a specified profile and writes it into the specific eSIM card.

Figure 7:
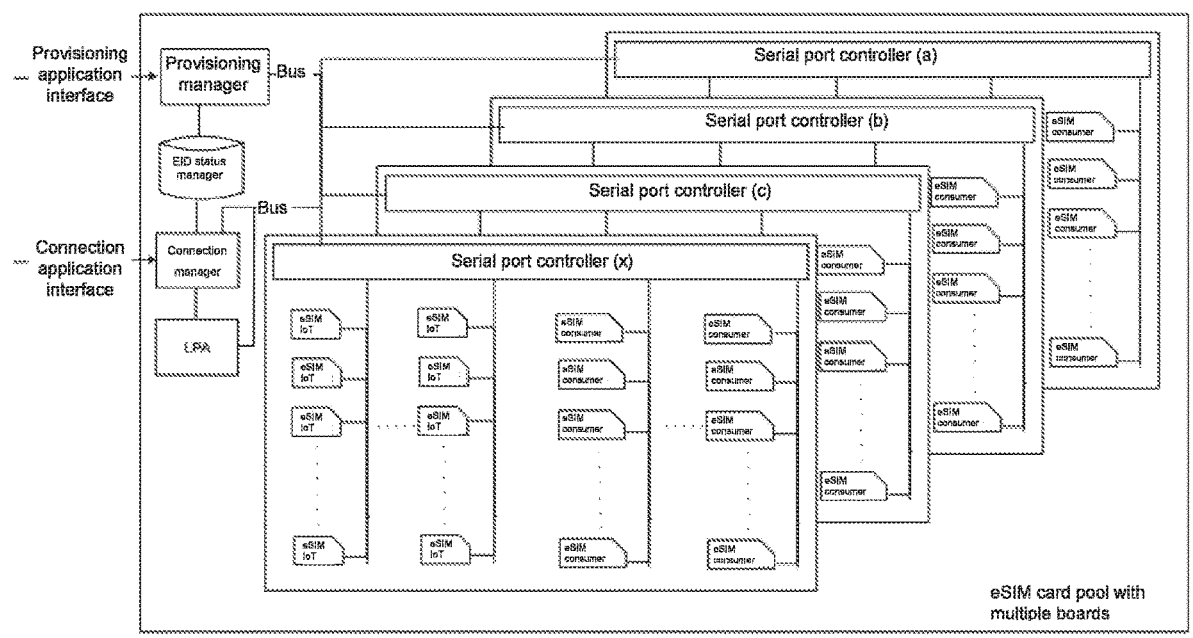
FIG. 7 is a block diagram of another embodiment of an eSIM-based card pool system.

As shown in FIG. 7, in a preferred embodiment of the present invention, the eSIM card pool unit comprises at least one card pool board, and each card pool board is connected to the provisioning manager, the connection manager and/or the LPA manager via bus. Therefore, the system can achieve unlimited expansion of card pool by adding card pool boards, which solves the problem that a physical SIM pool cannot meet the scale expansion at present. In this embodiment, a plurality of card pool boards are connected via the bus, an the provisioning manager/connection manager is responsible for receiving external triggering instructions and addressing and controlling any sub-board in the card pool, and the usage status of all eSIM chips is recorded in the EID status manager. Theoretically, the eSIM card pool system can be expanded without limit to maximize the number of eSIM chips. In addition, each eSIM card in the eSIM card group can connect to the same or different network side servers (SM-SR/SM-DP, SM-DP+) as needed to facilitate the management of eSIM cards.

In an eSIM-based card pool system of the present invention, the eSIM card pool unit comprises a trusted execution environment unit, the trusted execution environment unit comprises a trusted virtual serial port and at least one eSIM instance group (instead of physical eSIM chips), each eSIM instance in the eSIM instance group communicates with the trusted virtual serial port, and the trusted virtual serial port receives an initial profile or a specified profile and writes it to a specific eSIM instance.

Figure 8:
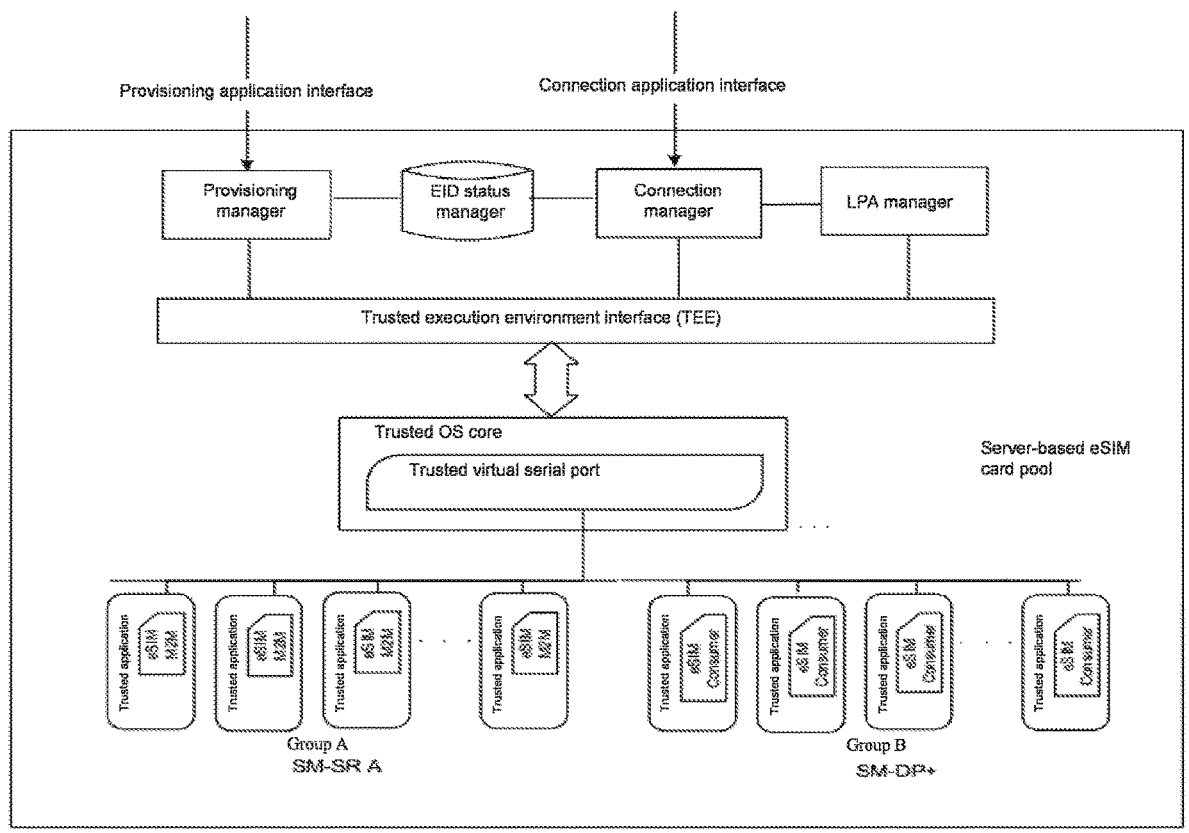
FIG. 8 is a block diagram of another embodiment of an eSIM-based card pool system.

As shown in FIG. 8, in a preferred embodiment of the present invention, the eSIM card pool unit comprises a trusted execution environment unit, a trusted virtual serial port, and at least one eSIM instance group that connects to the provisioning manager, the connection manager and/or the LPA manager through the trusted execution environment interface. Unlimited expansion of card pool can be achieved by adding eSIM instance groups, which solves the problem that physical SIM card pool cannot meet the scale expansion at present. In this embodiment, unlike the aforementioned card pool where eSIM is a physical chip, the eSIM here is completely replaced by a software-only approach, namely a software eSIM card pool system based on TEE (trusted execution environment). In one specific implementation, a powerful server can be used to provide a stable and secure TEE environment, and then an eSIM instance can be ported to run in TEE and enable it to have exactly the same power as a physical eSIM chip. The eSIM instance may be a secured application running within the TEE. The TEE and various independent eSIM instances communicate via the virtual serial port. The eSIM card pool based on this architecture can also connect a plurality of subscriber data routing SM-SR/subscriber data storage SM-DP (or subscriber data storage SM-DP+) servers, and a huge number of eSIM cards can be logically grouped corresponding to each server, so as to facilitate management and control. The software eSIM card pool architecture based on TEE also has flexible expansibility, and its solutions include but are not limited to creating a plurality of TEE environments in one server and running a plurality eSIMs in each TEE; or it can be extended through connecting a plurality of servers. The eSIM card pool can be grouped based on the same logic, and each group corresponds to a subscriber data routing SM-SR/subscriber data storage SM-DP (or subscriber data storage SM-DP+) server for easy management.

As shown in FIG. 9, the present invention provides a control method of an eSIM-based card pool system, wherein:

after receiving a download instruction, a connection manager issues a request to inquire an eSIM address to an EID status manager, receives a returned eSIM address, and according to the eSIM address, establishes a communication connection between a specific eSIM card (or eSIM instance within an TEE) and a subscriber data routing server; and the specific eSIM card downloads a relevant instruction from the subscriber data routing server, and according to the relevant instruction, downloads the specified profile from a subscriber data storage server.

In the existing GSMA standard, the control of eSIM (SIM profile downloading, deletion, etc.) of the M2M eSIM specification is highly dependent on SMS as the triggering condition. For example, when the operator needs to download a new SIM profile into an eSIM, it will first send a message over the air to the initial SIM profile in the eSIM. After receiving this message, the eSIM will establish a data channel with SM-SR/SM-DP according to the protocol, and then start to download the SIM profile. However, the dependence on SMS inevitably requires the establishment of a corresponding SMS center, which greatly increases the complexity and cost of the back end network, and at the same time, affects the control efficiency of the network on the eSIM. As a card pool system providing background services, the present invention proposes an eSIM control mechanism that does not rely on SMS.

In an embodiment of the present invention, take SIM profile download as an example: at the network side, the mechanism needs an external API instruction to trigger the subscriber data routing SM-SR server. After being triggered, the subscriber data routing SM-SR server starts to prepare the relevant download instruction and waits for the data connection with the corresponding eSIM. At the local eSIM card pool side, the connection manager is triggered by a similar external API instruction to initiate the data connection between the eSIM and the subscriber data routing SM-SR server. Through this data channel, the eSIM obtains the relevant instruction from the network side subscriber data routing SM-SR server. Based on this instruction, the eSIM downloads the corresponding SIM profile from the network side subscriber data storage SM-DP server, and writes it into the local eSIM card pool via the corresponding serial port and driver circuit. The improved M2M control signaling process is shown in FIG. 10. The whole download process does not rely on SMS triggering, and the external API instruction and network side remote provisioning instruction can be implemented by a software method, thus greatly improving the control efficiency. At the same time, the connection manager can connect to a plurality of SM-SR/SM-DP servers to download from different network terminals and write SIM profiles of different operators into different card pools.

The control method of the eSIM-based card pool system provided by the present invention is to match the eSIM card pool system of the aforementioned embodiments. In this method, external API instructions are used to trigger the connection manager to establish the data connection between the specific eSIM card and the subscriber data routing SM-SR server. Through this data channel, the specific eSIM card obtains a relevant instruction from the subscriber data routing SM-SR server, and based on the instruction, the specific eSIM card then downloads the corresponding SIM profile from the network end subscriber data storage SM-DP server. In this method, the original M2M control process is improved, the whole download process does not rely on SMS triggering, and the external API instruction and network side remote configuration instruction can be implemented by a software method, thus greatly improving the control efficiency. Also, because SMS is no longer needed, there is no need to rely on building SMS centers, saving costs and maintenance. At the same time, the connection manager can connect to a plurality of groups of subscriber data routing SM-SR servers and subscriber data storage SM-DP servers to download SIM profiles of different operators from different networks and write them into different card pool groups.

As shown in FIG. 11, the present invention provides a control method of an eSIM-based card pool system, wherein:

after receiving a download instruction, a connection manager issues a request to inquire an eSIM address to an EID status manager, receives a returned eSIM address, and generates a triggering instruction and sends it to an LPA manager;

according to the triggering instruction sent by the connection manager, the LPA manager establishes a communication connection between a specific eSIM card and a subscriber data storage server, and after downloading a specified profile, the LPA manager writes the specified profile to the specific eSIM card.

In the existing GSMA technical standard, eSIM technology based on the consumer specification gives users the right to choose which SIM profile to download, which is achieved by the existence of the Local Profile Assistant (LPA) manager under this specification. After the user triggers the download instruction through the interface, the LPA can remotely connect the network side subscriber storage SM-DP+ server and complete the profile downloading and writing to the local terminal device in accordance with the protocol. An disadvantage of this method is that there is a one-to-one corresponding relationship between the LPA and the eSIM card, that is, one LPA manages one eSIM card. In order to adapt to the large number of eSIM cards in the card pool, the present invention proposes a mechanism for managing a plurality of eSIM cards by one LPA manager, and at the same time, the LPA manager can connect with a plurality of different network side SM-DP+ servers. The scheme does not require a display interface for user control, but sends an instruction to the connection manager to download the SIM profile through the software API interface. According to the instruction, the LPA connects to the corresponding subscriber data storage SM-DP+ server to download the profile, and writes it to the corresponding eSIM card pool via the serial port and driver circuit. The improved consumer control process is shown in FIG. 12.

In a preferred embodiment of the present invention, a control method is provided to match the aforesaid embodiments containing an LPA manager. In this method, an instruction of downloading a SIM profile is sent to the connection manager through the software API interface, and according to the instruction, the LPA manager connects to the corresponding subscriber data storage SM-DP+ server to download the specified profile and write it to the corresponding eSIM card pool. This method provides an improved consumer specification that does not require a user interface and improves control efficiency through direct control by API instruction. In addition, the eSIM card pool has a high degree of flexibility and can connect with a plurality of subscriber data routing SM-DP+ servers, realizing convenient download of SIM profiles from a plurality of operator platforms and flexible switching between a plurality of operators.

Two card pool schemes based on hardware eSIM chips and eSIM instances are described in the above embodiments. In one specific implementation, a card pool board may adopt either of the above schemes or a combination of the two. The above introduction to the control of card pool board takes downloading SIM profile as an example, but the specific implementation includes and is not limited to a variety of operations on eSIM, such as downloading, deleting, enabling and disabling SIM profiles. In addition, the present invention proposes an eSIM-based card pool mechanism, and regardless of the specific hardware implementation mode and material selection, whether the aforementioned control mechanism proposed by the present invention is used or not, whether the eSIM-based card pool is based on physical eSIM card or TEE pure software eSIM card, all of the card pool designs based on eSIMs shall fall within the scope of the present invention.

Further, as shown in FIG. 13, the present invention provides a control method of the eSIM-based card pool system, wherein:

a user interface unit receives user operation information, generates a download instruction, and sends it to a connection manager;

after receiving a download instruction, a connection manager issues an eSIM address request to an EID status manager, receives the requested eSIM address, generates a triggering instruction and sends it to the LPA manager;

according to the triggering instruction sent by the connection manager, the LPA manager establishes a communication connection between a specific eSIM card and a subscriber data storage server, and after downloading a specified profile, the LPA manager writes the specified profile to the specific eSIM card.

In a preferred embodiment of the present invention, a control method is provided to match the aforesaid embodiments containing an LPA manager and a user interface unit. In this method, the user interface unit receives user operation information, generates a download instruction, and sends it to the connection manager. By adding a user interface, consumer selection is achieved, and the standard consumer specification is implemented which makes the invention applicable to the standard consumer specification and improves the practicability of the present invention.

Further, as shown in FIG. 14, the present invention provides a control method of an eSIM-based card pool system, wherein:

a wireless receiver receives an SMS message, generates a download instruction after decoding and sends it to a connection manager;

after receiving the download instruction, the connection manager issues an eSIM address request to an EID status manager, receives the requested eSIM address, and establishes a communication connection between a specific eSIM card and a subscriber data routing server;

the specific eSIM card downloads a relevant instruction from the subscriber data routing server, and according to the relevant instruction, downloads a specified profile from the subscriber data storage server.

In a preferred embodiment of the present invention, a control method is provided to match the aforesaid embodiments containing a wireless receiver. In this method, after receiving a message, the wireless receiver generates a download instruction after decoding and sends it to the connection manager. By adding the wireless receiver, the connection manager can be triggered by SMS, thus implementing standard M2M specification, making the invention applicable to the standard M2M specification and improving the practicability of the present invention.

Figure 15:
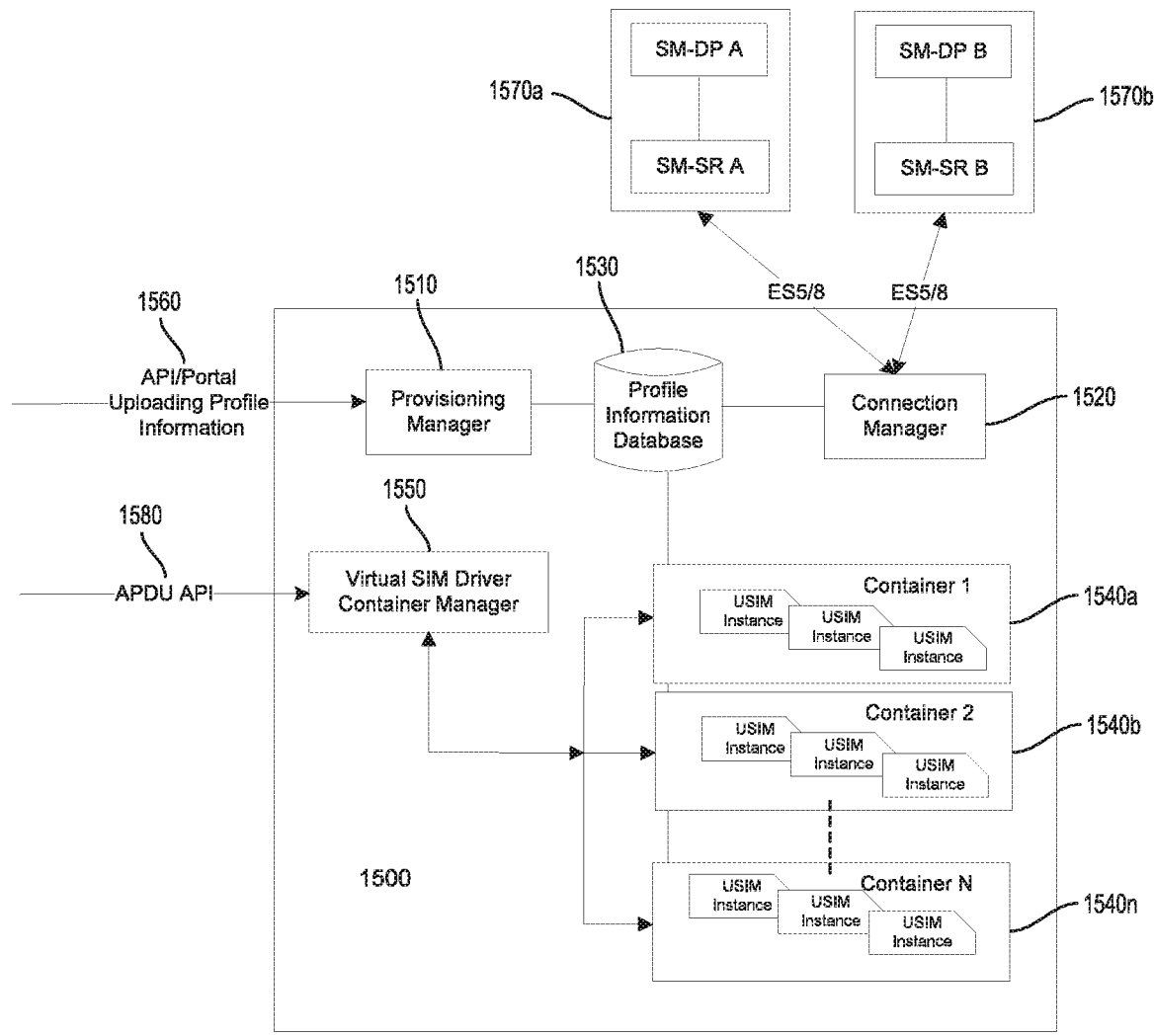
FIG. 15 is a block diagram of a software-based eSIM card pool without TEE according to an embodiment of the present invention.

As shown in FIG. 15, in an embodiment of the present invention, a software-based eSIM card pool can be implemented without the use of TEE. As shown in FIG. 15, a software-based eSIM card pool 1500 comprises a provisioning manager 1510, a connection manager 1520, a profile information database 1530, one or more virtual SIM containers 1540*a*-1540*n*, and a virtual SIM driver and container manager 1550. The provisioning manager 1510 receives one or more eSIM initial profiles or regular USIM profiles, from an external API or portal interface 1560 and writes the one or more initial eSIM profiles into the profile information database 1530. The connection manager 1520 receives one or more specified eSIM profiles from one or more eSIM management platforms 1570*a*, 1570*b*, and writes the one or more specified eSIM profiles into the profile information database 1530, and may overwrite one or more existing profiles. A profile in this embodiment may include all information required for performing SIM authentication, including an Integrated Circuit Card Identifier (ICCID), international mobile subscriber identity (IMSI), an authentication key (e.g., Ki), etc. Alternatively, the authentication key may be stored in a separate secure database. The virtual SIM driver and container manger 1550, based on information stored in the profile information database 1530, creates one or more virtual SIM containers 1540*a*-1540*n*. Each virtual SIM driver container 1540 may contain one or more virtual SIM instances. A virtual SIM instance contains algorithm that, when receiving a SIM authentication request, can calculate and output an appropriate SIM authentication result based on an authentication key stored in the profile information database 1530 or an external secure hardware element that can be securely accessed. The authentication key may be copied into the virtual SIM instance, but is preferably at a location separate from the virtual SIM instance. In this way, a virtual SIM instance can respond to all types of APDUs 1580 received and relayed by the virtual SIM driver and container manager 1550, and is considered as an eSIM chip from the outside.

Figure 16:
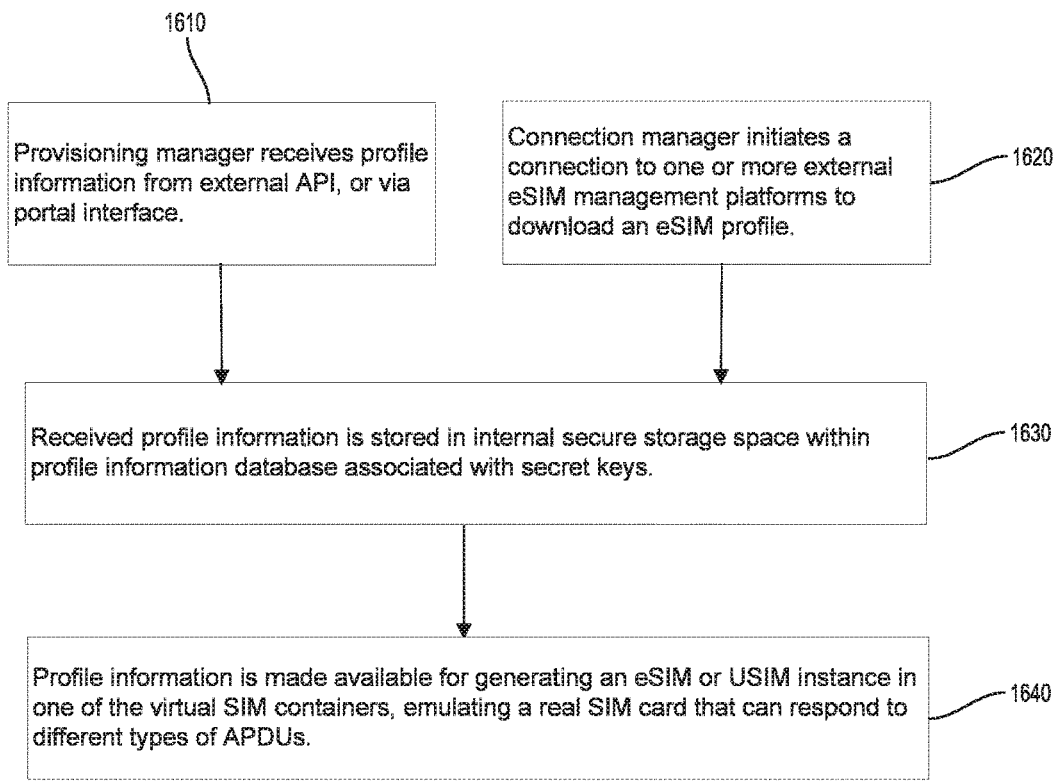
FIG. 16 is a flow chart of a process for uploading profile information into the eSIM card pool according to an embodiment of the present invention.

FIG. 16 shows an example process for uploading profile information into the eSIM card pool as described in FIG. 15, in an embodiment of the present invention. First, the provisioning manager 1510 receives 1610 profile information from an external API or via a portal interface, or the connection manger 1520 initiates 1620 a connection to one or more external eSIM management platforms, for example SM-DP/SM-SR/SM-DP+, to download an eSIM profile. Next, the received profile information is stored 1630 in an internal secure storage space within the profile information database 1530 associated with secret keys, for example authentication keys. The secret keys may be stored in the same profile information database 1530 or a separate secure database (e.g., an external secure hardware). Then, the profile information is made available 1640 for generating an eSIM or USIM instance in one of the virtual SIM containers 1540*a*-1540*n*, emulating a real SIM card that can respond to different types of APDUs. An eSIM instance, in contrast to a regular USIM instance, may support multiple profiles, but typically only one profile is active at a given time.

Figure 17:
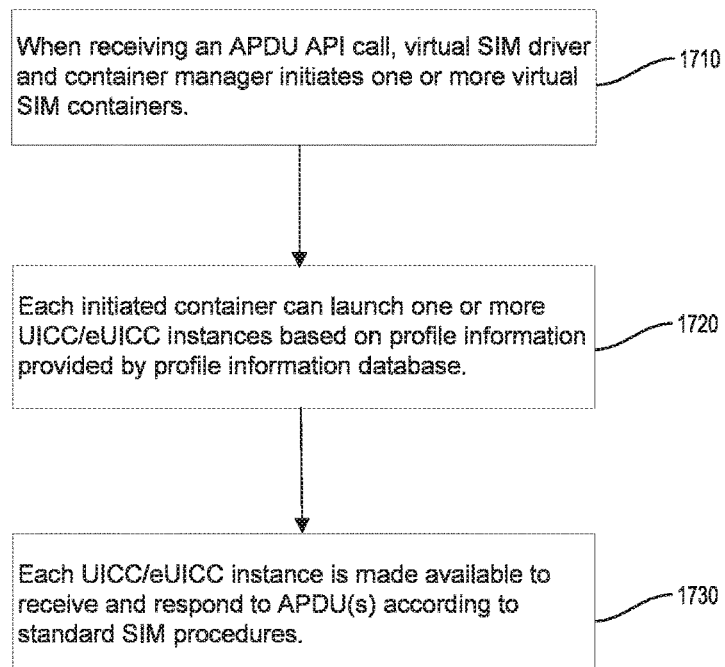
FIG. 17 is a flow chart of a process for creating one or more UICC/eUICC processes as one or more virtual SIMs according to an embodiment of the present invention.

FIG. 17 shows an example process for creating one or more UICC/eUICC processes as one or more virtual SIMs with the eSIM card pool as described in FIG. 15, in an embodiment of the present invention. First, when receiving an APDU API call, the virtual SIM driver and container manager 1550 initiates 1710 one or more virtual SIM containers 1540*a*-1540*n*. Each initiated container can launch 1720 one or more UICC/eUICC instances based on profile information provided by the profile information database 1530. Once launched, each UICC/eUICC instance is made available 1730 to receive and respond to APDU(s) according to standard SIM procedures, just like a physical SIM card. In alternative embodiments, the virtual SIM containers 1540*a*-1540*n* and UICC/eUICC instances may be created before an APDU call is received.

The preferred embodiments of the present invention are described above. It should be pointed out that those skilled in the art may make improvements and refinements without departing from the principles of the present invention, and such improvements and refinements shall be regarded as within the protection scope of the present invention.

What is claimed is:

1. An eSIM-based card pool system, comprising:
a first card pool board comprising a first plurality of eSIM chips;
a second card pool board comprising a second plurality of eSIM chips;
an eSIM manager, comprising a database that stores corresponding relationships between a plurality of eSIM identifications and a plurality of eSIM addresses; and
a connection manager communicatively coupled to the first card pool board and the second card pool board, and configured to:
request a first eSIM address from the eSIM manager based on a received download instruction, and
write a specified eSIM profile into a first eSIM from either the first card pool board or the second card pool board having the first eSIM address;
access an external SIM authentication request generated from a mobile device;
instruct the specified eSIM profile to provide a response to the external SIM authentication request; and
cause the response from the specified eSIM profile to be transmitted to the mobile device.

2. The eSIM-based card pool system according to claim 1, further comprising:
a provisioning manager communicatively coupled to the connection manager, and configured to request a second eSIM address from the eSIM manager based on a received provisioning instruction, and write an initial eSIM profile into a second eSIM having the second eSIM address.

3. The eSIM-based card pool system according to claim 1, further comprising:
an local profile assistant (LPA) manager communicatively coupled to the connection manager and the first and second card pool boards, and configured to receive a triggering instruction from the connection manager, establish a data connection with a remote server, and download the specified eSIM profile from the remote server.

4. The eSIM-based card pool system according to claim 3, wherein the remote server is an SM-DP+ server.

5. The eSIM-based card pool system according to claim 3, wherein the triggering instruction is received from the connection manager upon the connection manager receiving an API instruction.

6. The eSIM-based card pool system according to claim 3, further comprising:
a user interface unit communicatively coupled to the connection manager, and configured to generate the download instruction based on an activation code received from a an external entity, and send the download instruction to the connection manager.

7. The eSIM-based card pool system according to claim 1, wherein the connection manager is further configured to establish a data connection with a first remote server, receive a routing instruction from the first remote server, and download the specified eSIM profile from a second remote server based on the routing instruction.

8. The eSIM-based card pool system according to claim 7, wherein the connection manager is configured to establish the data connection with the first remote server upon receiving an API instruction.

9. The eSIM-based card pool system according to claim 8, wherein the specified eSIM profile is prepared by the second remote server upon receiving a second API instruction.

10. The eSIM-based card pool system according to claim 7, further comprising a wireless receiver, wherein the connection manager is configured to establish the data connection with the first remote server upon the wireless receiver receiving an SMS message.

11. The eSIM-based card pool system according to claim 7, wherein the first remote server is an SM-SR server, and the second remote server is an SM-DP server.

12. The eSIM-based card pool system according to claim 1, wherein at least one of the first and second card pool boards further comprises a serial controller, and the serial controller is connected to the plurality of eSIMs and is connected to the connection manger.

13. The eSIM-based card pool system according to claim 1, further comprising:
a trusted execution environment (TEE) interface coupled to the connection manager; and
a TEE operating system coupled to the TEE interface,
wherein at least one of the first and the second card pool boards unit is coupled to the TEE operating system, and the plurality of eSIMs are software-based eSIM applications.

* * * * *